United States Patent [19]
Johenning

[11] Patent Number: 5,373,594
[45] Date of Patent: * Dec. 20, 1994

[54] WATERBED MATTRESS WITH HOSE-ACTUATED DRAIN VALVE IN CORNERPIECE

[75] Inventor: John B. Johenning, Beverly Hills, Calif.

[73] Assignee: Strata Flotation, Inc., Torrance, Calif.

[*] Notice: The portion of the term of this patent subsequent to Dec. 21, 2010 has been disclaimed.

[21] Appl. No.: 152,814

[22] Filed: Nov. 15, 1993

Related U.S. Application Data

[60] Continuation-in-part of Ser. No. 840,059, Feb. 21, 1992, Pat. No. 5,271,111, and a continuation-in-part of Ser. No. 470,163, Jan. 25, 1990, which is a division of Ser. No. 395,715, Aug. 18, 1989, Pat. No. 4,930,172.

[51] Int. Cl.⁵ ................ A47C 27/08; F16K 15/20
[52] U.S. Cl. ................................. 5/451; 5/917
[58] Field of Search .............. 5/451, 450, 449, 918, 5/460, 474, 917; 141/352, 353, 354, 357, 65

[56] References Cited

U.S. PATENT DOCUMENTS

| | | | |
|---|---|---|---|
| 1,659,047 | 2/1928 | Quinn | 184/1.5 |
| 3,787,908 | 1/1974 | Beck et al. | 5/451 |
| 4,269,237 | 5/1981 | Berger | 141/346 |
| 4,766,628 | 8/1988 | Walker | 5/449 |
| 4,930,172 | 6/1990 | Johenning | 5/451 |
| 4,951,723 | 8/1990 | Hoeptner, III | 141/98 |
| 5,027,453 | 7/1991 | Koenig | 5/451 |
| 5,062,170 | 11/1991 | Johenning | 5/451 |
| 5,271,111 | 12/1993 | Johenning | 5/451 |

*Primary Examiner*—Alexander Grosz
*Attorney, Agent, or Firm*—Flehr, Hohbach, Test, Albritton & Herbert

[57] ABSTRACT

Waterbed mattress having a drain valve which is opened and closed by the insertion and removal of a hose connector to control the passage of water from the mattress. The valve is located in a cornerpiece at one corner of the mattress, and a hose is readily connected to the valve through an opening in the deck of the support structure on which the mattress rests.

8 Claims, 5 Drawing Sheets

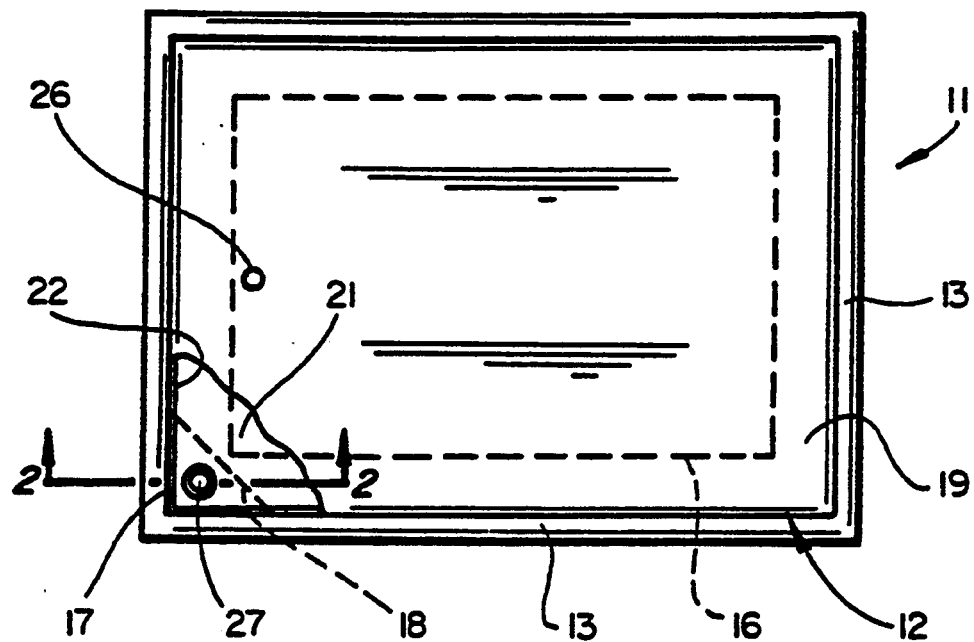
FIG_1
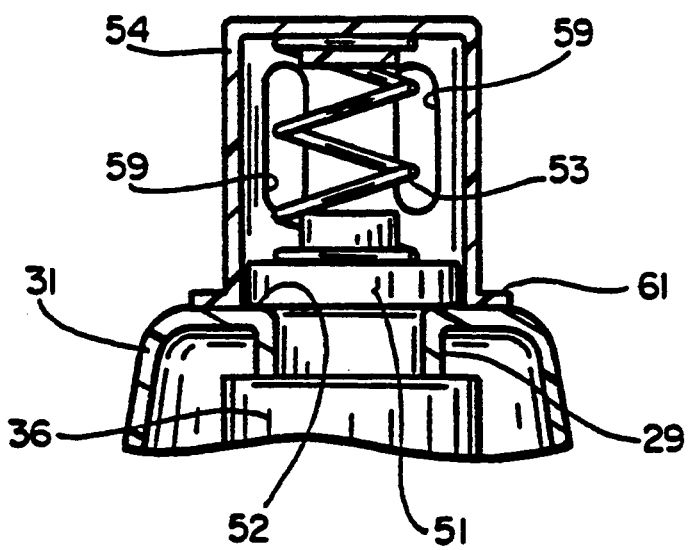
FIG_4

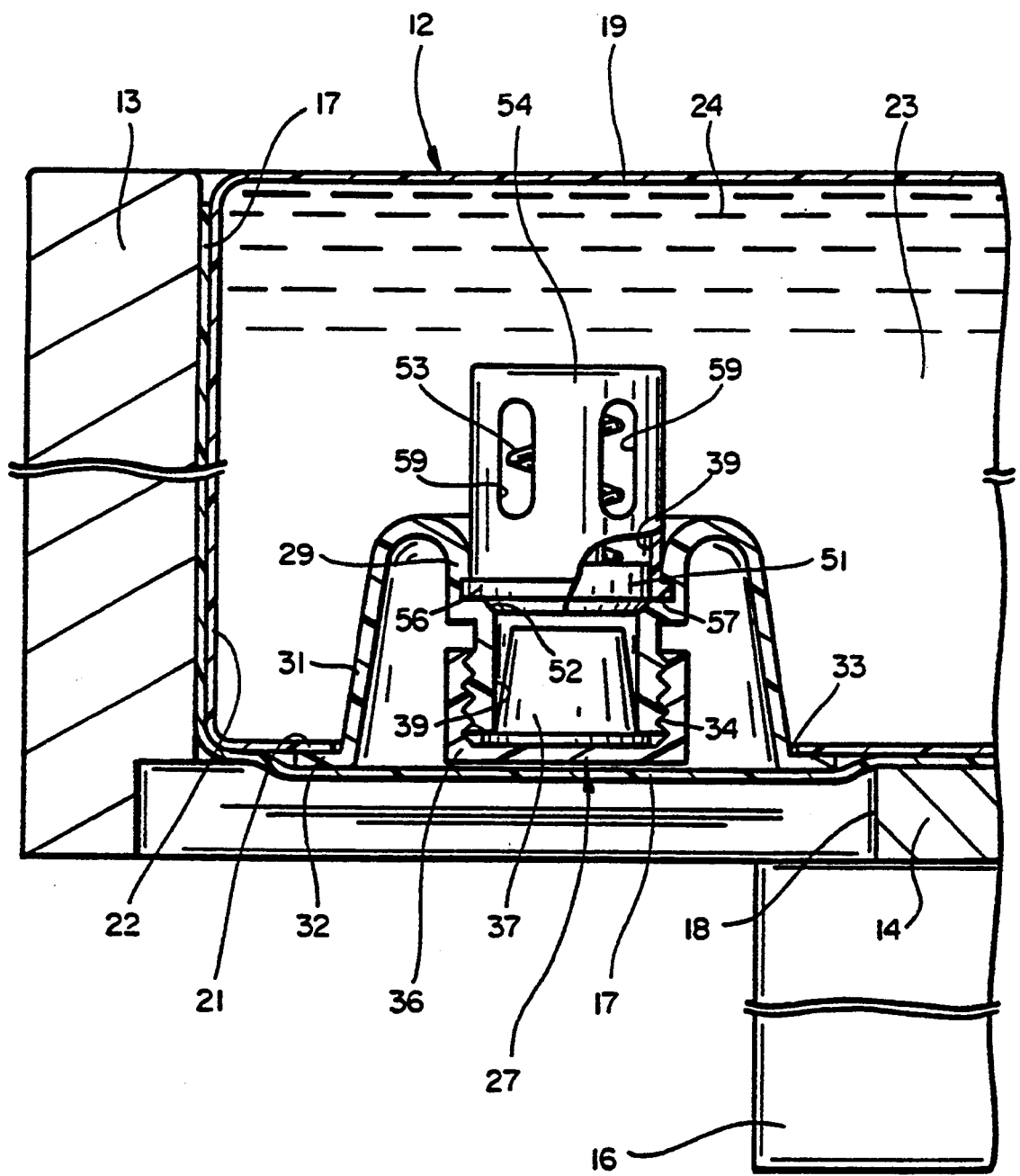
FIG_2

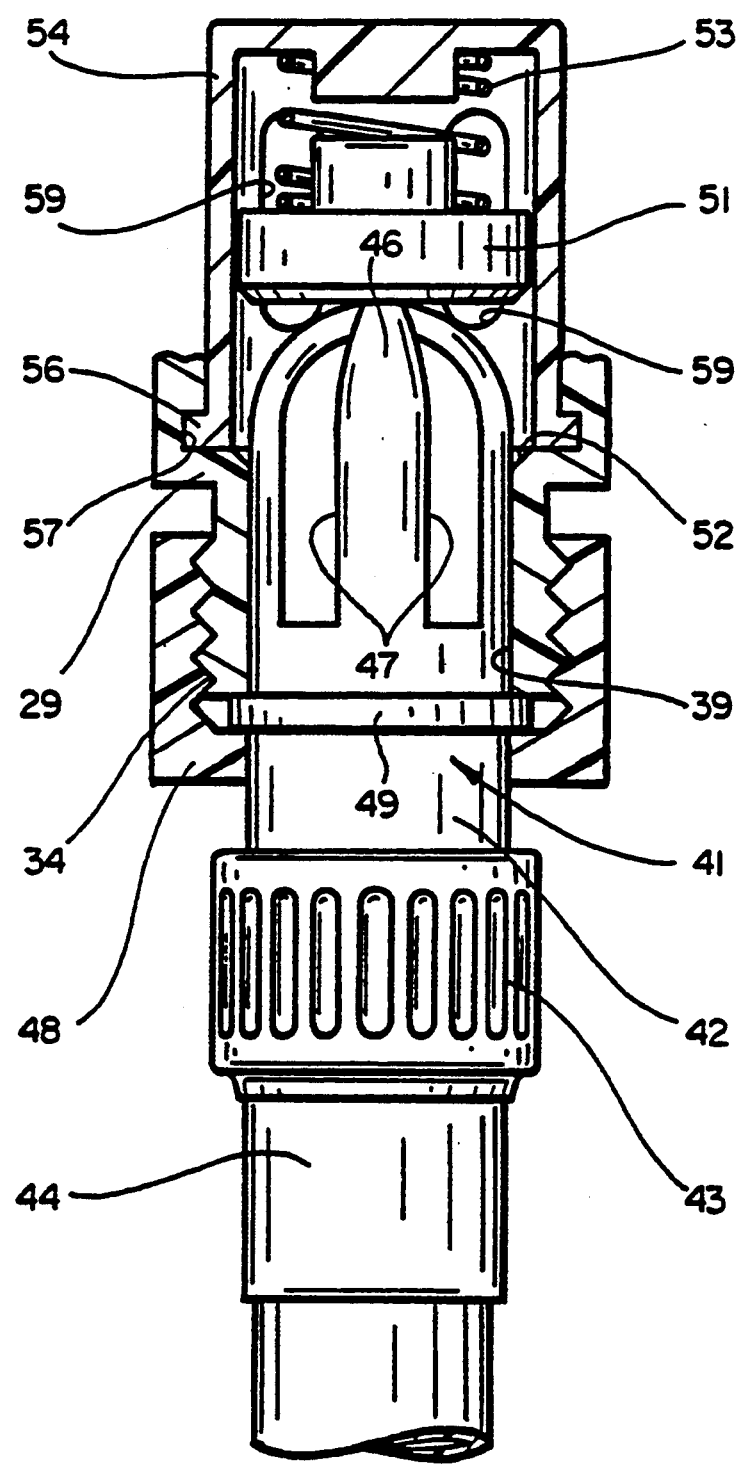
FIG_3

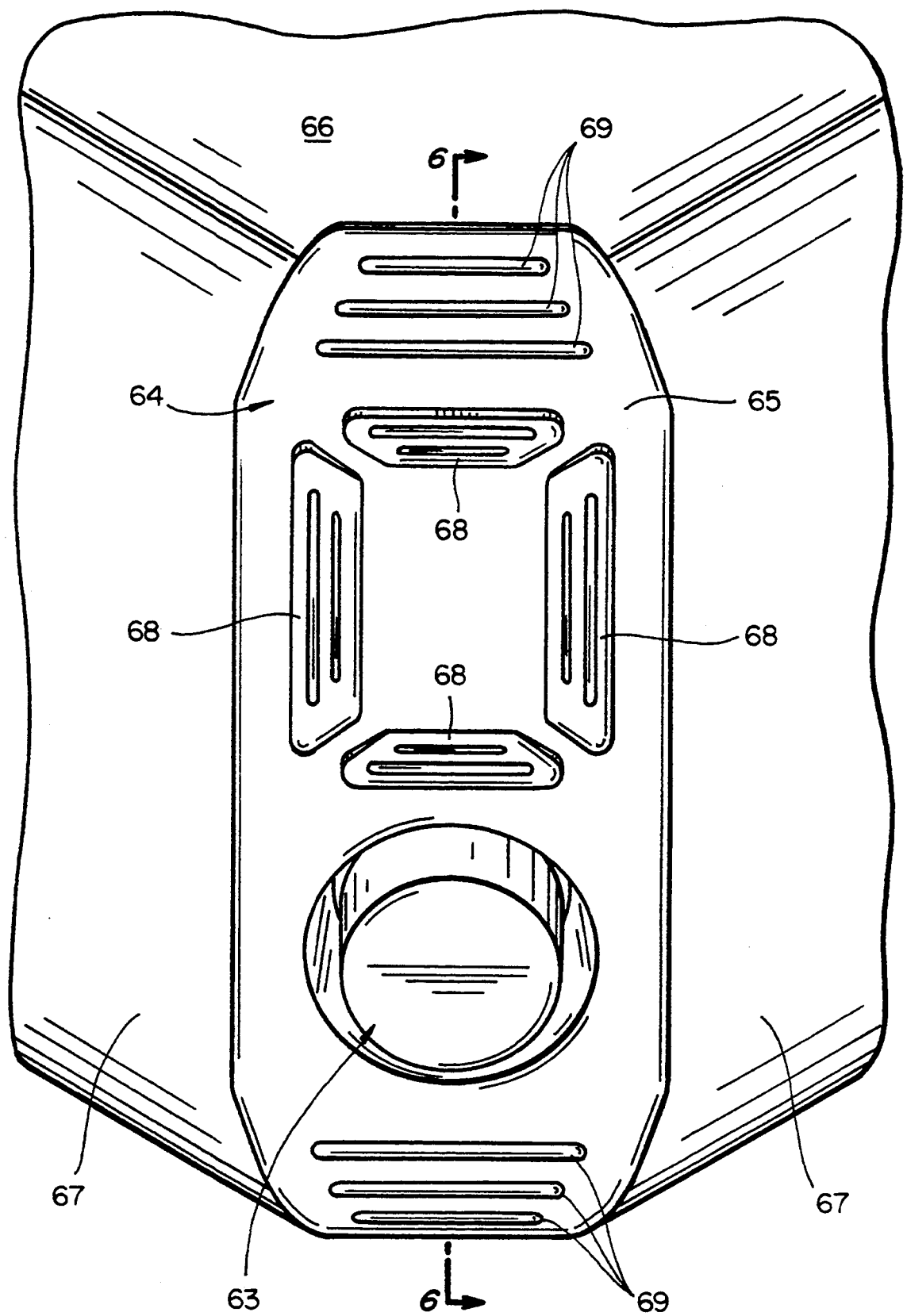
FIG_5

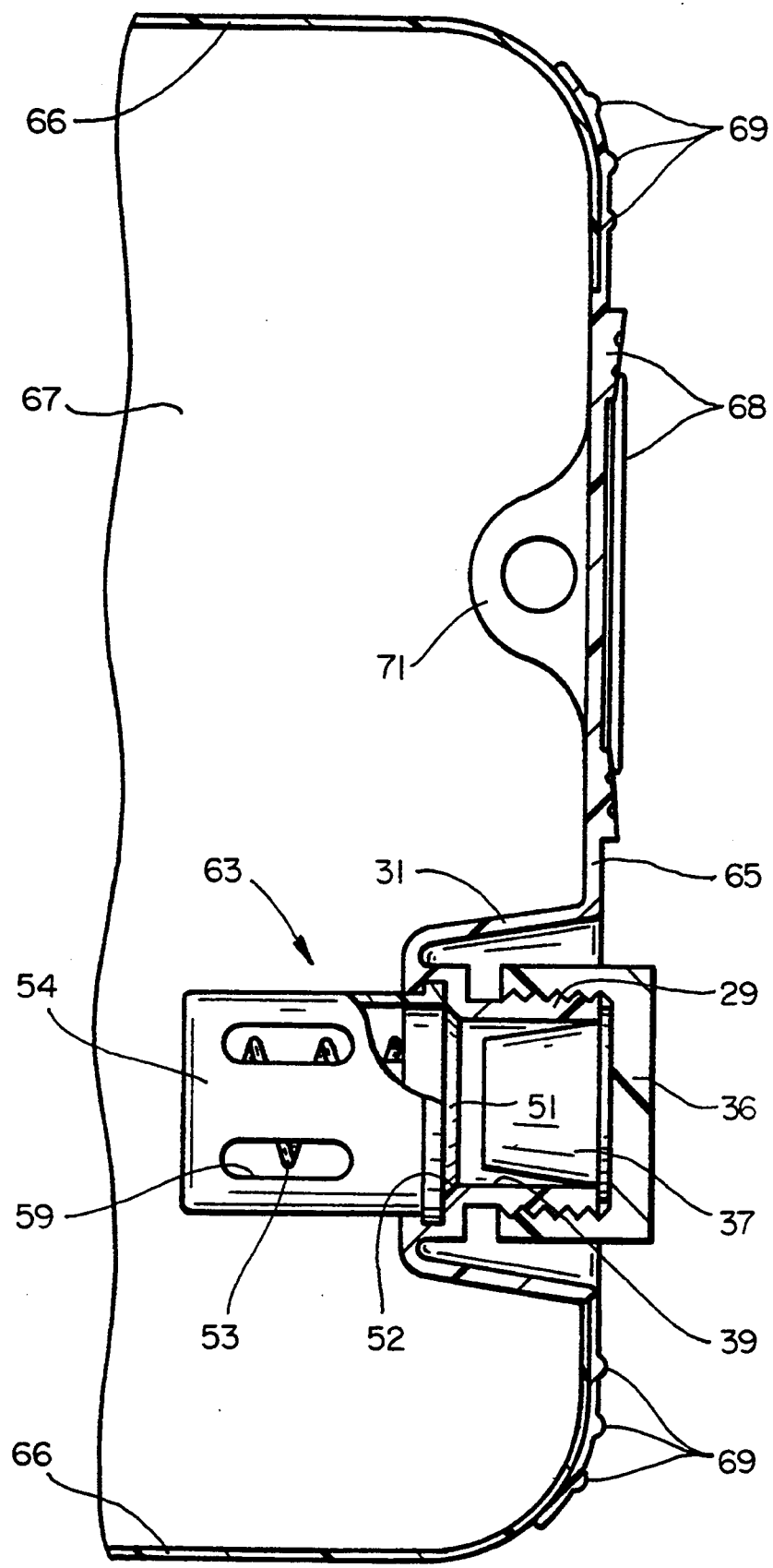
FIG_6

WATERBED MATTRESS WITH HOSE-ACTUATED DRAIN VALVE IN CORNERPIECE

This is a continuation-in-part of Ser. No. 07/840,059, filed Feb. 21, 1992, now U.S. Pat. No. 5,271,111 and of Ser. No. 07/470,163, filed Jan. 25, 1990, which is a division of Ser. No. 07/395,715, filed Aug. 18, 1989, now U.S. Pat. No. 4,930,172.

This invention pertains generally to waterbeds and, more particularly, to a waterbed mattress and valve assembly which facilitates the removal of water from the mattress.

One of the most troublesome tasks with a waterbed is removing the water from the mattress when the bed is to be moved or the mattress replaced. Most waterbed mattresses have what is commonly referred to as a "valve" in the upper wall thereof, which is utilized both for filling and for draining the mattress. This so-called "valve" is generally no more than an opening with a removable closure through which a hose or a connector attached to a hose is inserted when water is to be introduced into or removed from the mattress. The water is typically removed by syphoning or pumping it through the hose.

At one time, instead of having a "valve" in the upper wall, some waterbed mattresses had a short length of hose connected to an opening in the lower wall of the mattress, with a hose connector with a removable cap or plug at the outer end of the hose. This hose was tucked beneath or beside the mattress when not in use and was pulled out between the mattress and the frame when the mattress was to be filled or drained.

It is in general an object of the invention to provide a new and improved waterbed mattress and valve assembly which facilitate the removal of water from the mattress.

Another object of the invention is to provide a waterbed mattress and valve assembly of the above character which overcome the limitations and disadvantages of techniques heretofore employed in the draining of waterbed mattresses.

These and other objects are achieved in accordance with the invention by providing a waterbed mattress having a drain valve which is opened and closed by the insertion and removal of a hose connector to control the passage of water from the mattress. The valve is located in a cornerpiece at one corner of the mattress, and a hose is readily connected to the valve through an opening in the deck of the support structure on which the mattress rests.

FIG. 1 is a top plan view, partly broken away, of one embodiment of a waterbed incorporating the invention.

FIG. 2 is an enlarged cross-sectional view taken along line 2—2 in FIG. 1, illustrating one embodiment of the drain valve according to the invention.

FIG. 3 is an operational view of the drain valve of FIG. 2, with a hose connector inserted and the valve in an open position.

FIG. 4 is a fragmentary cross-sectional view of another embodiment of a drain valve according to the invention.

FIG. 5 is a fragmentary elevational view of one embodiment of a waterbed mattress with a drain valve located in a cornerpiece thereof in accordance with the invention.

FIG. 6 is a cross-sectional view taken along line 6—6 in FIG. 5.

In the drawings, the invention is illustrated in connection with a waterbed 11 having a water-filled mattress 12, a rigid circumscribing frame 13 which provides lateral support for the water in the mattress, a horizontally extending deck 14 on which the mattress and frame rest, and a pedestal or base 16 which supports the deck above the floor. A safety liner 17 extends along the sides and bottom of the mattress between the mattress and the frame and deck. The frame deck are of greater lateral extent than the base, and one corner of the deck is cut away to form a triangular opening 18 outboard of the base.

The mattress has a top wall 19, a bottom wall 21 and side walls 22 which are fabricated of a flexible, water impervious material such as 20 mil polyvinylchloride (PVC). The mattress has an internal chamber 23 which contains a body of water 24. If desired, an insert such as one or more pads or mats of fibrous material (not shown) can be placed in the chamber to reduce wave motion in the water. An insert structure with drainage channels for facilitating the removal of water from the mattress is found in U.S. Pat. No. 5,050,257.

A fill valve 26 of conventional design is provided in the top wall of the mattress for introducing water into the mattress, and a drain valve 27 is provided in the bottom wall for removing water from the mattress. As illustrated in FIG. 1, the drain valve is located toward one corner of the mattress above the opening 18 in the deck. When an insert structure of the type shown in U.S. Pat. No. 5,050,257 is employed, the drainage channels are arranged to direct water toward the drain valve.

The drain valve has an externally threaded stem 29 disposed coaxially within a cup 31 which is formed integrally with the stem. An annular flange 32 at the rim of the cup is bonded to the bottom wall of the mattress by heat sealing or other suitable means, with the cup extending in an inverted position through an opening 33 in the bottom wall into the interior of the mattress. The stem faces in a downward direction and is accessible externally of the mattress. The stem and cup are fabricated of a relatively soft material such as a flexible PVC, and the stem has an external thread 34 on which a cap 36 is removably mounted. A reinforcing plug 37 is placed in the outer portion of the stem when the cap is installed to support the relatively soft material of the stem when the cap is tightened.

The stem has an axially extending passageway or port 39 which is adapted to receive a hose connector 41 through which water is removed from the mattress. The hose connector has a generally cylindrical body 42 with a proximal end 43 adapted for connection to a hose 44, and a distal end 46 which is closed and rounded. Openings 47 toward the distal end of the side wall communicate with the hose through a central passageway in the connector. The connector is secured to the valve stem by a nut 48 which bears against an external rib 49 on the connector body and engages the thread 34 on the stem, with the portion of the connector body between the openings and the rib in sealing engagement with the side wall of port 39. The connector is fabricated of a relatively rigid material such as a hard PVC.

The drain valve includes means for preventing water from passing from the interior of the mattress to the outlet port except when the connector is inserted into the valve. This means includes a valve member 51 which is movable between open and closed positions relative to a valve seat 52 surrounding the port opening in response to insertion and removal of the connector, with a coil spring 53 urging the valve member toward the seat.

In the embodiment illustrated in FIG. 2, the valve member and spring are mounted in a generally cylindrical cage 54 which has an external rib 56 that snaps into a groove 57 in the stem near the inner end of the passageway or port. The valve member is movable axially within the cage, and the spring is positioned between the valve member and the inner end of the cage. The valve seat 52 is formed in the relatively soft material of stem 29 and is conically tapered. The spring urges the valve member into sealing engagement with the seat when the hose connector is removed. When the hose connector is inserted, it engages the valve member and moves it away from the seat against the urging of the spring, with a substantially water-tight seal being formed between the outer surface of the connector body and the inner wall of port 39. Openings 59 in the side of the cage permit water to enter the cage and pass through the openings 47 when the connector is fully inserted and in sealing engagement with the valve. The valve member and cage are fabricated of a relatively rigid material such as a hard PVC, and the spring is fabricated of a suitable material such as stainless steel.

The embodiment of FIG. 4 is generally similar to the embodiment of FIG. 2, and like reference numerals designate corresponding elements in the two embodiments. In the embodiment of FIG. 4, the cage has an annular mounting flange 61 at its outer end which is sonically welded or affixed by other suitable means to the inner end of cup 31, with the valve seat 52 being formed by the relatively soft material of the cup near the flange. In this embodiment, the valve member is fabricated of a relatively hard material such as Delrin, and it seats against the relatively soft material of the cup to provide a good seal.

When the waterbed is being filled or in normal use, the hose connector is removed from the drain valve, and spring 53 urges valve member 51 into sealing engagement with valve seat 52 to prevent water from passing from the mattress to the valve port. Plug 37 is inserted into the outer end of the port, and cap 36 is installed on the stem to prevent the leakage of any water which might get past the valve member.

To drain the mattress, the corner of the mattress where the drain valve is located is lifted up, the liner is folded down, and the hose is inserted through the opening in the deck, with the connector attached. Cap 36 and plug 37 are removed, and the connector is inserted into the valve. When the connector engages the valve member, it moves the valve member away from the seat, allowing water to pass through openings 59 and 47 to the passageway in the connector and thence to the hose. Once the connector has been inserted, the corner of the mattress is placed down on top of the folded liner, and the water is drained out of the mattress.

Rather than draining or syphoning the water through the drain valve, it is sometimes desirable to pump the water out of the mattress through fill valve 26. When the water is removed in this manner from a conventional mattress with a fiber insert, it is necessary to stop the pump and admit air into the mattress through the fill valve to get the last of the water out of the fiber insert to an area where it can be picked up by the pump. With the drain valve of the invention, the cap and plug can be removed while the pump is connected to the fill valve and running, and the suction created within the mattress by the pump will draw air into the mattress through the drain valve to dislodge the water from the insert. This enables the mattress to be emptied more quickly and efficiently.

In the embodiment of FIG. 5, the valve assembly 63 is mounted in a cornerpiece 64 at a corner of the mattress. Cornerpiece 64 comprises a generally rectangular base plate 65 with mitered corners and is fabricated of soft PVC or other suitable material which is readily bonded to the walls 66, 67 of the mattress. A plurality of trapezoidal cleats 68 and raised beads 69 project from the outer side of the base plate, and an eyelet 71 projects from the inner side. The cleats are arranged in a rectangular pattern, and the beads are positioned toward the upper and lower ends of the base plate. The eyelet serves an anchor point for a tether line (not shown) connected to a fiber mat or other wave dampening insert within the mattress.

Although the cornerpiece may be fabricated of the same material as the walls of the mattress, it is thicker and tougher than the mattress walls and provides an increased degree of resistance to abrasion and punctures. The base plate can, for example, have a thickness on the order of 0.020 to 0.080 inch, with the cleats and beads projecting from the front surface by a distance on the order of 0.050 to 0.110 inch. In addition to adding resistance to punctures and abrasion, the raised cleats and beads serve to grip the bedsheets and retain them on the bed. Cornerpieces of this type are described and illustrated in greater detail in U.S. Pat. No. 4,930,172, the disclosure of which is incorporated herein by reference.

Valve assembly 63 is similar to the valve assembly shown in FIG. 4, and like reference numerals designate corresponding elements in the two figures. In the embodiment of FIG. 5, however, cup 31 and stem 29 are formed integrally with and of the same material as the cornerpiece. This structure is advantageously formed as a monolithic structure by injection molding and then sealed to the top, bottom and side walls of the mattress by ultrasonic welding, heat sealing or other suitable means to form a corner of the mattress.

The valve assembly is located in the lower portion of the cornerpiece below the rectangular pattern of cleats 68 and above the lower set of beads 69, where it is readily accessible through an opening such as opening 18 in the corner of the deck of the platform which supports the mattress.

The invention has a number of important features and advantages. It overcomes the problems of removing water from a waterbed mattress through a valve opening in the top wall, and permits the water to be removed from the bottom. The hose connector is readily attached and removed, and the process is made even easier by having the access opening in the deck of the frame through which the connection can be made. This valve is particularly effective when used with a baffle structure or insert which directs the water toward the valve as shown in U.S. Pat. No. 5,050,257.

It is apparent from the foregoing that a new and improved waterbed mattress and drain valve assembly have been provided. While only certain presently preferred embodiments have been described in detail, as will be apparent to those familiar with the art, certain changes and modifications can be made without departing from the scope of the invention as defined by the following claims.

I claim:

1. In a waterbed: a horizontally extending deck, a bladder resting on the deck and having walls of flexible material defining a generally rectangular chamber, a body of water in the chamber, a rectangular frame surrounding the bladder and providing lateral support for the water in the chamber, an opening in the deck toward one corner of the frame, a cornerpiece sealed to the walls at a corner of the mattress adjacent to the opening in the deck, a drain valve in the cornerpiece communicating with the chamber and having a port into which a connector can be inserted and removed through the opening in the deck, and means responsive to insertion and removal of the connector for permitting water to pass from the chamber to the port when the connector is inserted and blocking the passage of water from the chamber to the port when the connector is removed.

2. The waterbed of claim 1 wherein the means for permitting water to pass and blocking the passage of water comprises a valve seat surrounding the port, a valve member adapted to be moved away from the valve seat by the connector, and means yieldably urging the valve member toward the valve seat.

3. The waterbed of claim 1 wherein the cornerpiece and the drain valve are formed as a unitary structure.

4. In a waterbed: a horizontally extending, generally rectangular deck having an opening toward one corner thereof, a flexible bladder resting on the deck and containing a body of water, said bladder having top, bottom and side walls with cornerpieces sealed to the walls at the corners of the mattress, a rigid frame circumscribing the bladder and providing lateral support for the body of water therein, and a valve in the cornerpiece adjacent to the opening in the deck, said valve including a port into which a connector can be inserted and removed, and means responsive to insertion and removal of the connector for permitting water to pass from the bladder to the port when the connector is inserted and blocking the passage of water from the bladder to the port when the connector is removed.

5. The waterbed of claim 4 wherein the means for permitting water to pass and blocking the passage of water comprises a valve seat, a valve member adapted to be moved away from the valve seat by the connector, and means yieldably urging the valve member toward the valve seat.

6. The waterbed of claim 4 wherein the cornerpiece in which the valve is mounted and the valve are formed as a unitary structure.

7. In a waterbed mattress: a bladder having top, bottom and side walls defining a generally rectangular chamber for holding a body of water, a cornerpiece having a base plate of relatively soft material affixed to the walls forming one corner of the chamber, a valve stem formed integrally with the base plate and having an axially extending port therein, a valve seat formed in the relatively soft material and disposed concentrically of the port, a cage formed of a relatively hard material affixed to the stem, a valve member carried by the cage for movement into and out of sealing engagement with the valve seat for controlling communication with the chamber through the port, and means yieldably urging the valve member toward sealing engagement with the valve seat.

8. The waterbed mattress of claim 7 further including a plurality of raised surface elements projecting from the base plate.

* * * * *